United States Patent
Weksler et al.

(10) Patent No.: US 10,034,138 B2
(45) Date of Patent: Jul. 24, 2018

(54) COMPANION DEVICE LOCATION WITHIN ENCLOSED SPACES

(71) Applicant: Lenovo (Singapore) Pte. Ltd., Singapore (SG)

(72) Inventors: Arnold S. Weksler, Raleigh, NC (US); John Carl Mese, Cary, NC (US); Nathan J. Peterson, Oxford, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/217,580

(22) Filed: Jul. 22, 2016

(65) Prior Publication Data

US 2018/0027379 A1    Jan. 25, 2018

(51) Int. Cl.
*H04W 24/00* (2009.01)
*H04W 4/02* (2018.01)

(52) U.S. Cl.
CPC ................ *H04W 4/027* (2013.01)

(58) Field of Classification Search
CPC .......... H04W 4/02; H04W 8/18; H04W 64/00
USPC .......... 455/456.1, 456.2, 456.3, 456.6, 414.2
See application file for complete search history.

(56) References Cited

U.S. PATENT DOCUMENTS

| | | | |
|---|---|---|---|
| 2008/0119201 A1* | 5/2008 | Kolber | H04W 8/18 455/456.1 |
| 2015/0018008 A1* | 1/2015 | Schlesinger | H04W 64/00 455/456.1 |
| 2017/0205246 A1* | 7/2017 | Koenig | G01C 21/3682 |

* cited by examiner

*Primary Examiner* — Temica M Beamer
(74) *Attorney, Agent, or Firm* — Ference & Associates LLC

(57) ABSTRACT

One embodiment provides a method, including: collecting, at a first device, local movement tracking data comprising distance and direction travelled by the first device; receiving, at the first device, local movement tracking data of a second device; and providing, using combined local movement tracking data of the first device and the second device, a location indication of the second device using an output device of the first device. Other aspects are described and claimed.

18 Claims, 3 Drawing Sheets

COMPANION DEVICE LOCATION WITHIN ENCLOSED SPACES

BACKGROUND

Users often carry mobile electronic devices (e.g., smart phones). Many such devices have location services and may be programmed with tracking or locating applications, e.g., "find my phone" applications.

These applications tend to rely on GPS technology or triangulation techniques that leverage network device locations and signal strengths to locate a device. GPS technology offers fine location resolution accuracy (on the order of meters) but suffers from difficulties related to signal reception in certain environments. Triangulation techniques theoretically offer fine location resolution accuracy (on the order of meters) but often in practice this is not the case for a variety of reasons, e.g., insufficient devices to perform triangulation, insufficient data to perform accurate triangulation, etc.

BRIEF SUMMARY

In summary, one aspect provides a method, comprising: collecting, at a first device, local movement tracking data comprising distance and direction travelled by the first device; receiving, at the first device, local movement tracking data of a second device; and providing, using combined local movement tracking data of the first device and the second device, a location indication of the second device using an output device of the first device.

Another aspect provides an electronic device, comprising: an output device; a processor operatively coupled to the output device; and a memory device that stores instructions executable by the processor to: collect local movement tracking data comprising distance and direction travelled; receive local movement tracking data of a second device; and provide, using combined local movement tracking data of the electronic device and the second device, a location indication of the second device using the output device.

A further aspect provides a product, comprising: a storage device that stores code, the code being executable by a processor and comprising: code that detects, at the first device, a distance between the first device and the second device; code that determines, using a processor of the first device, that the distance is greater than a preconfigured threshold; and code that activates, at the first device, movement tracking; wherein the code that activates comprises code that activates movement tracking locally at the first device.

A yet further aspect provides a method, comprising: detecting, at a first device, a distance between the first device and a second device; determining, using a processor of the first device, that the distance is greater than a preconfigured threshold; activating, at the first device, movement tracking; receiving, at the first device, movement tracking data of the second device; and providing, using combined movement tracking data of the first device and the second device, a location indication of the second device using an output device of the first device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
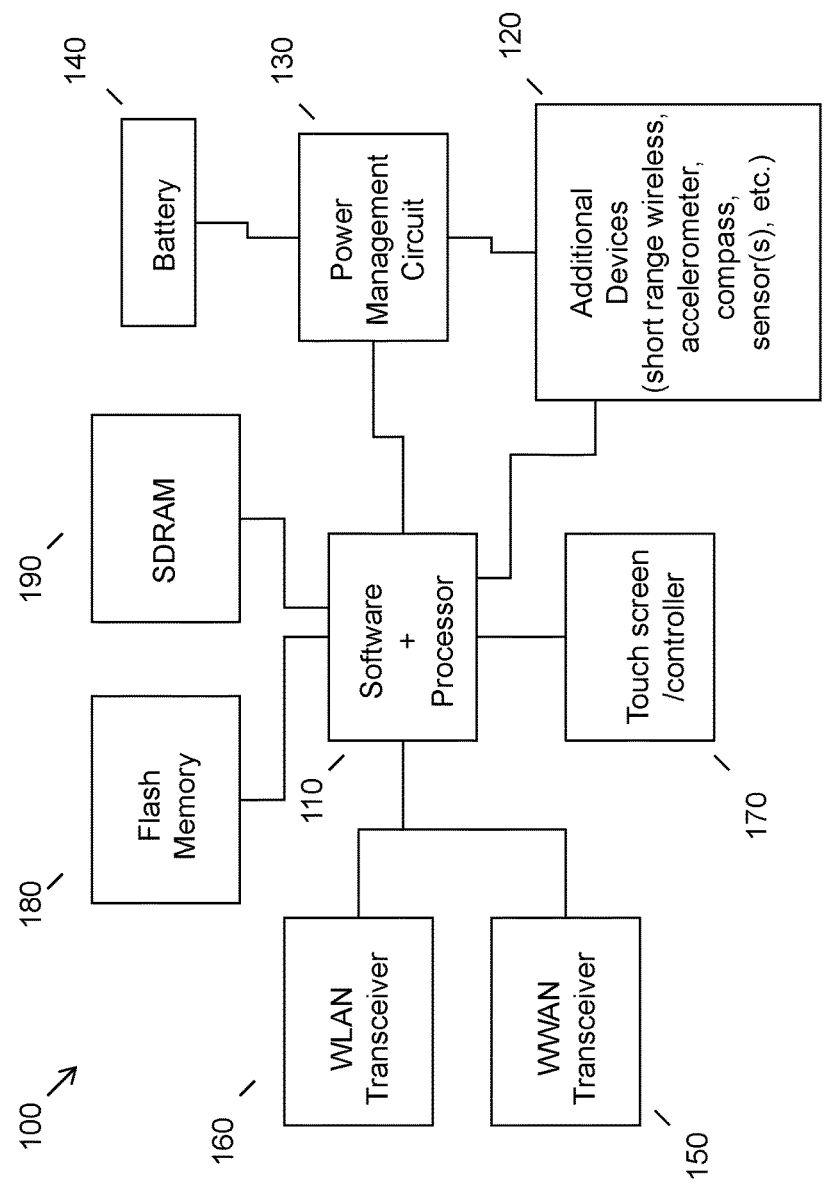
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Locating a companion device within an enclosed space such as a large building is difficult. For example, when inside an indoor shopping mall or similar venue, users may get separated from one another. While devices that the users carry, such as their smart phones, wearable devices, etc., may offer conventional location services, these tend to either fail entirely when indoors or in an environment where GPS signals are not available or at best such devices offer inaccurate location determinations, e.g., using triangulation techniques. Thus, such users are often left with no choice but to place a voice call or send a text message in an effort to find the other member(s) of the group.

Accordingly, an embodiment provides a technique by which each device of a group of devices (e.g., two or more devices) may initiate local tracking and thereafter share that locally collected tracking data with the other device(s). This permits each device to independently track itself from a starting point and report this data to the other device(s). As each device is provided with the local tracking data of the other device(s), each device may resolve its relative location with respect to the other device(s) by combining the movement tracking data.

By way of specific example, when walking together with another group member, e.g., a family member or a friend, a user's device determines when the distance between itself and the other group member's device is greater than a particular threshold (e.g., 10 feet). When the threshold has been achieved or exceeded, the user's devices each turn on a local tracking mechanism, e.g., dead reckoning.

When the user wishes to locate the other group member, both sets of movement tracking data (e.g., movement tracking data locally collected by implementing dead reckoning to determine a distance and direction walked) are retrieved and the travel traversed is calculated and compared to resolve the user's device location relative to that of the other device(s) in question. A location indication may be provided, e.g., a map showing the distance and travel path to the other device may be displayed.

For example, after local tracking is initiated, if a first user walks to the east for 20 steps and the user's companion walks 15 steps to the west during the same time frame, a location indication provided may instruct the first user to walk in the other direction for 35 steps. Additionally, each device's direction may be captured and a comparison with of the direction of the other device made, where a calculated travel route to reach the other device is then shown. As described herein, the location indication may be provided in a graphical form so that the relative position of both parties can be seen, e.g., with general navigational aids to allow a reunion.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an accelerometer, a compass, short-range wireless devices, other sensors, etc. System 100 often includes a touch screen 170 for data input and display/rendering. System 100 also typically includes various memory devices, for example flash memory 180 and SDRAM 190.

Figure 2:
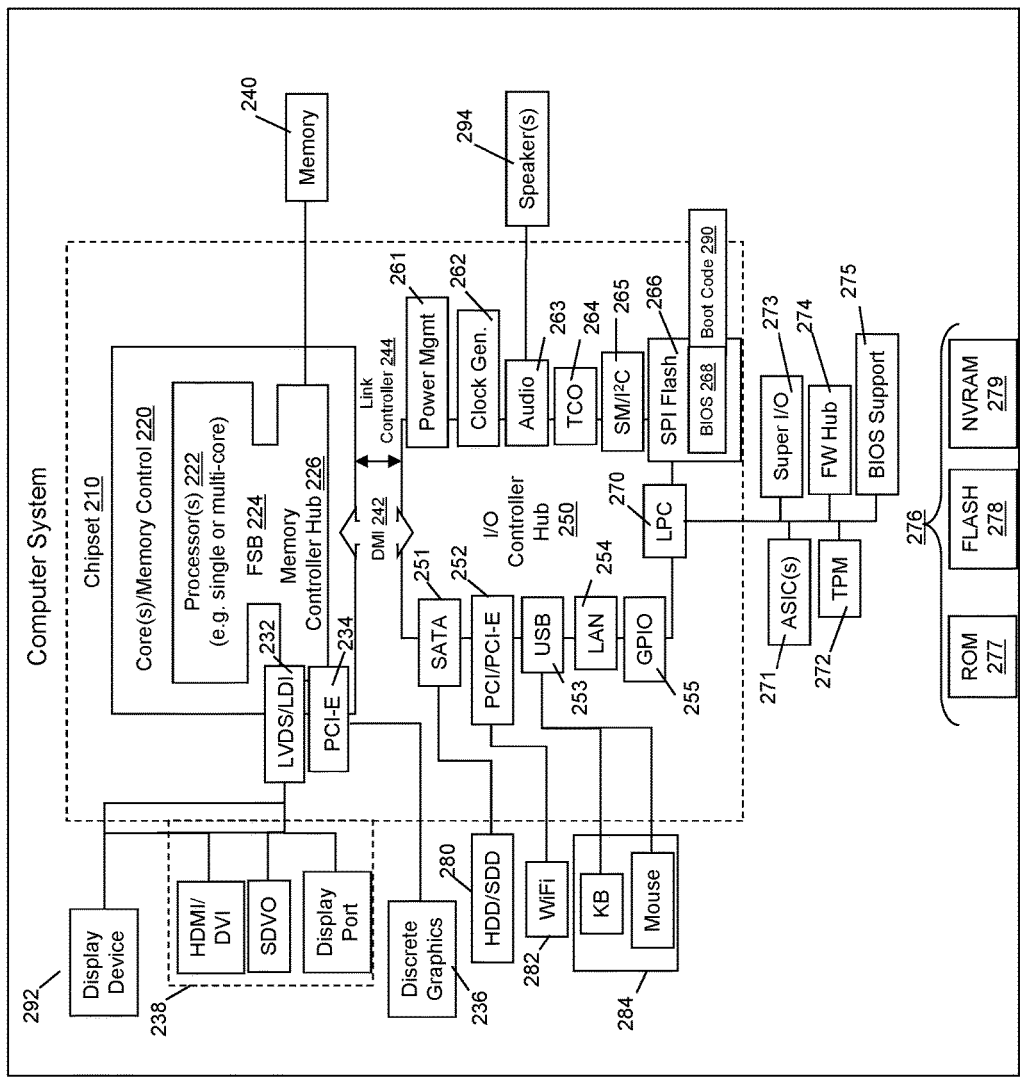
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in mobile electronic devices such as smart phones that users carry.

Such devices may be used to determine their proximity from one another, e.g., using short-range wireless signal strength, and to trigger a local tracking mechanism based on distance between devices. Moreover, such devices may communicate with one another indirectly, e.g., via a network connection facilitated by other devices, e.g., communication over the Internet.

Figure 3:
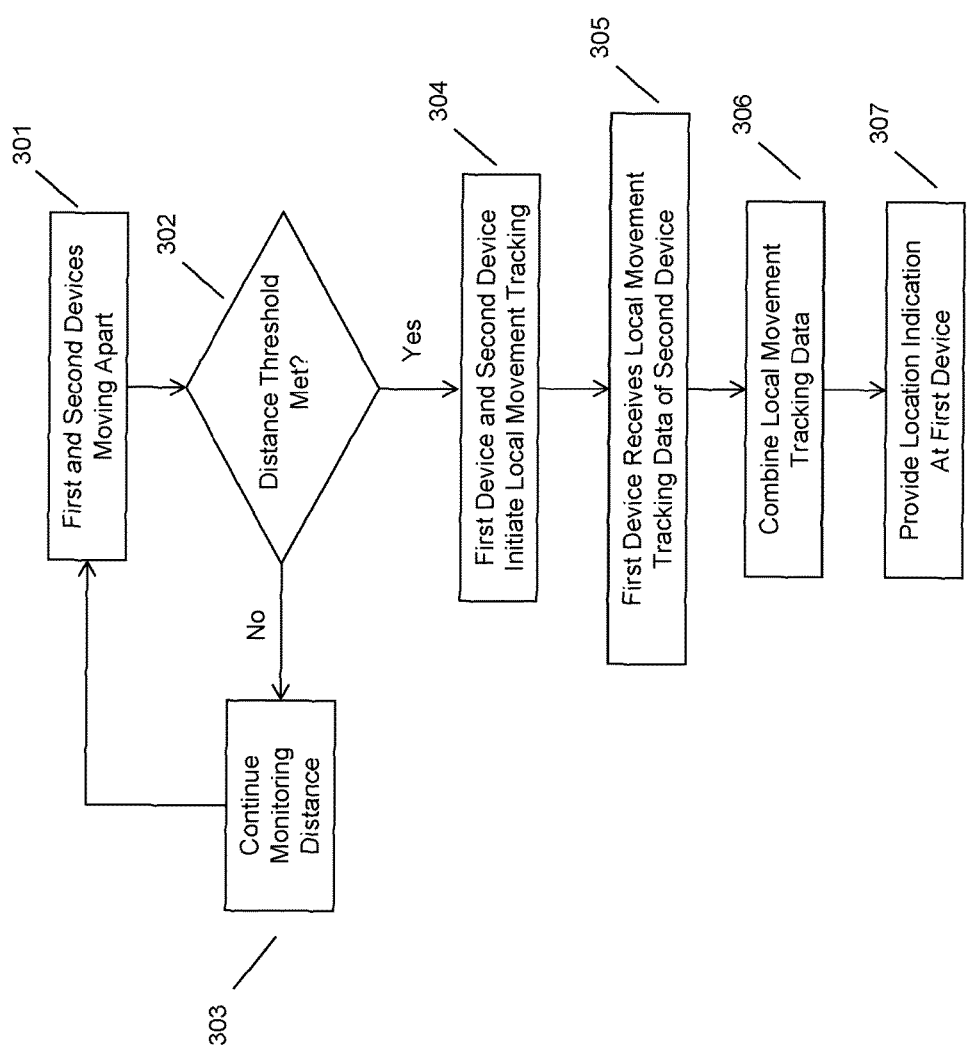
FIG. 3 illustrates an example method of companion device location within enclosed spaces.

As shown in FIG. 3, taken from the perspective of a first device in a group of devices, if the devices are moving apart, a first device detects a distance between the first device and a second device is increasing, as illustrated at 301. If the first device determines that the distance is greater than a preconfigured threshold at 302, e.g., on the order of feet, the first device activates local movement tracking (as does the second device), illustrated at 304. The second device may similarly determine the distance has exceeded the predetermined threshold, and the devices may communicate such detections between devices of the group. If the threshold is not met, the local tracking may not be initiated, and the devices may continue to monitor the distance.

As the movement tracking is implemented locally, the first device receives movement tracking data of the second device, as illustrated at 305. This movement tracking data may be communicated directly between the devices if a local communication connection is active there-between; however, the devices may communicate the movement tracking data through another connection, e.g., over the Internet. In an embodiment, the local movement tracking data collected by each device may be communicated to the other device(s) on an on-going basis, such that near real-time location determinations may be made. Alternatively, the local movement tracking data collected by each device may be communicated in a batch, e.g., in response to a request made by a device for movement tracking data collected by other device(s).

It should be noted that the locally collected movement tracking data may be processed prior to its reception by another device. For example, the second device's movement tracking data may be formatted by another device (e.g., a remote server) prior to its reception by the first device. Moreover, another device (e.g., a remote server) may combine the first device's locally collected movement tracking data and the second device's locally collected movement tracking data prior to providing movement tracking data to the first device. Thus, the first device might receive formatted mapping data of both devices at 305, where the remote server has already combined the movement tracking data of each device (illustrated at 306).

In an embodiment, having received the movement tracking data of the second device at 305, the first device may combine the movement tracking data of the second device with movement tracking data it has collected at 306, if this has not been done so already. This permits the first device to resolve not only the distance it has travelled since local movement tracking was initiated, but also permits the first device to determine (or be informed of) the distance travelled by the second device since local tracking was initiated on the second device.

As such, the first device may provide, using the combined movement tracking data, a location indication of the second device using an output device of the first device, as illustrated at 307. The location indication may be provided in a variety of ways. For example, a map graphic may be provided illustrating a suggested travel path to reach the second device based on the location of each device. The suggested travel path may correspond to steps taken by each device as they depart from one another. Alternatively, the location indication may be provided in a textual format, where instructions are displayed to the user for reaching the location of the second device. Other possibilities for the location indication include but are not limited to a simple arrow indicator showing a direction to travel to reach the second device, with or without a distance metric apprising the user of the first device how far to travel to reach the second device.

The activating of local movement tracking may include initiating dead reckoning at the each device. This may be accomplished for example by recording a direction metric, e.g., facilitated by compass data, along with a distance metric, e.g., facilitated by accelerometer data correlated with step movement of the device. The movement tracking data of the each device may include two dimensional movement data (i.e., location and direction) or three dimensional movement data (i.e., location, direction and altitude or elevation).

The receiving, at 305, of movement tracking data of a device may proceed without issuing a request for such data. For example, the devices may be configured to report the local movement tracking data on an ongoing basis to a remote service, which in turn may provide the movement tracking data (alone or as combined with another device's movement tracking data) on an ongoing basis. For example, a remote device may provide the movement tracking data as a continuous data stream.

Therefore the various embodiments provide a convenient mechanism by which local tracking data may be collected by devices of a group, reported to one another, and used to resolve relative locations. This technique improves the device's ability to determine its relative location, even in an enclosed space where conventional location services may not be available.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at a first device associated with a first member of a group, a distance between the first device and a second device associated with a second member of the group is greater than a preconfigured threshold;
   activating, at the first device and based upon the distance being greater than the preconfigured threshold, movement tracking locally at the first device;
   collecting, at the first device, local movement tracking data, wherein the local movement tracking data comprises data based upon a distance and a direction travelled and tracked by the first device relative to a starting location;
   receiving, at the first device, local movement tracking data of the second device wherein the local movement tracking data of the second device comprises data based upon a distance and a direction travelled and tracked by the second device relative to the starting location; and
   providing, using combined local movement tracking data of the first device and the second device, a location indication of the second device using an output device of the first device, wherein the location indication comprises a dynamic indication of the second member relative to the first member.

2. The method of claim 1, wherein the activating movement tracking locally at the first device comprises initiating dead reckoning at the first device.

3. The method of claim 2, wherein the movement tracking data of the first device comprises two dimensional movement data.

4. The method of claim 3, wherein the movement tracking data of the first device comprises three dimensional movement data.

5. The method of claim 1, wherein the receiving, at the first device, movement tracking data of the second device comprises receiving the movement tracking data of the second device after requesting the movement tracking data of the second device.

6. The method of claim 1, wherein the receiving, at the first device, movement tracking data of the second device comprises receiving the movement tracking data of the second device without issuing a request.

7. The method of claim 1, wherein the receiving, at the first device, movement tracking data of the second device comprises receiving movement tracking data intermittently.

8. The method of claim 1, wherein the receiving, at the first device, movement tracking data of the second device comprises receiving movement tracking data as a continuous data stream.

9. The method of claim 1, wherein the providing, using the combined movement tracking data, a location indication of the second device using an output element of the first device comprises providing a map view.

10. An electronic device, comprising:
    an output device;
    a processor operatively coupled to the output device; and
    a memory device that stores instructions executable by the processor to:
    detect, at a first device associated with a first member of a group, a distance between the first device and a second device associated with a second member of the group is greater than a preconfigured threshold;
    activate, at the first device and based upon the distance being greater than the preconfigured threshold, movement tracking locally at the first device;
    collect at the first device, local movement tracking data, wherein the local movement tracking data comprises data based upon a distance and a direction travelled and tracked by the first device relative to a starting location;
    receive local movement tracking data of the second device wherein the local movement tracking data of the second device comprises data based upon a distance and a direction travelled and tracked by the second device relative to the starting location; and
    provide, using combined local movement tracking data of the electronic device and the second device, a location indication of the second device using the output device, wherein the location indication comprises a dynamic indication of the second member relative to the first member.

11. The electronic device of claim 10, wherein the movement tracking comprises initiating dead reckoning at the electronic device.

12. The electronic device of claim 11, wherein the movement tracking data comprises two dimensional movement data.

13. The electronic device of claim 12, wherein the movement tracking data comprises three dimensional movement data.

14. The electronic device of claim 10, wherein receipt of movement tracking data comprises receiving the movement tracking data of the second device after requesting the movement tracking data of the second device.

15. The electronic device of claim 10, wherein receipt of movement tracking data comprises receiving the movement tracking data of the second device without issuing a request.

16. The electronic device of claim 10, wherein receipt of movement tracking data comprises receiving movement tracking data intermittently.

17. The electronic device of claim 10, wherein the location indication of the second device comprises a map view.

18. A product, comprising:
- a storage device that stores code, the code being executable by a processor and comprising:
- code that detects, at a first device associated with a first member of a group, a distance between the first device and a second device associated with a second member of the group is greater than a preconfigured threshold;
- code that activates, at the first device and based upon the distance being greater than the preconfigured threshold, movement tracking locally at the first device;
- code that collects, at the first device, local movement tracking data, wherein the local movement tracking data comprises data based upon a distance and a direction travelled and tracked by the first device relative to a starting location;
- code that receives, at the first device, local movement tracking data of the second device, wherein the local movement tracking data comprises data based upon a distance and a direction travelled and tracked by the second device relative to a starting location; and
- code that provides, using combined local movement tracking data of the first device and the second device, a location indication of the second device using an output device of the first device, wherein the location indication comprises a dynamic indication of the second member relative to the first member.

* * * * *